United States Patent
Brunswick

(12) 
(10) Patent No.: US 6,494,610 B1
(45) Date of Patent: Dec. 17, 2002

(54) PIVOTABLE BOWL MOUNTING MECHANISM

(75) Inventor: Brian A. Brunswick, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 09/561,828

(22) Filed: Apr. 28, 2000

(51) Int. Cl.⁷ .................................................. B01F 7/16
(52) U.S. Cl. ....................................................... 366/207
(58) Field of Search ...................... 366/96–98, 197–199, 366/203, 207, 288, 220

(56) References Cited

U.S. PATENT DOCUMENTS

| | | | |
|---|---|---|---|
| 32,482 A | | 6/1861 | Lane |
| 227,239 A | * | 5/1880 | Frentress |
| 320,255 A | | 6/1885 | Jackman |
| 735,353 A | | 8/1903 | Eifert |
| 760,693 A | * | 5/1904 | Lancaster et al. |
| 826,223 A | | 7/1906 | Broadwell |
| 879,590 A | | 2/1908 | Roth |
| 1,264,128 A | * | 4/1918 | Rataiczak |
| 1,415,735 A | * | 5/1922 | Trust et al. |
| 1,428,704 A | * | 9/1922 | Petri |
| 1,468,615 A | | 9/1923 | Guttenstein et al. |
| 1,548,041 A | * | 8/1925 | Johnston et al. |
| 1,562,704 A | | 11/1925 | Kevan |
| 1,695,345 A | * | 12/1928 | Read |
| 1,743,271 A | * | 1/1930 | Gould |
| 1,761,237 A | * | 6/1930 | Schiff |
| 1,767,002 A | * | 6/1930 | Johnston et al. |
| 1,774,509 A | * | 9/1930 | Gould |
| 1,781,321 A | | 11/1930 | Dehuff |
| 2,024,282 A | * | 12/1935 | Geiger |
| 2,251,903 A | * | 8/1941 | Anstice et al. |
| 3,075,746 A | * | 1/1963 | Yablonski et al. |
| 3,533,603 A | * | 10/1970 | Kovacs |
| 3,758,183 A | | 9/1973 | Steinkamp et al. |
| 4,042,221 A | * | 8/1977 | Myers et al. |

(List continued on next page.)

FOREIGN PATENT DOCUMENTS

| | | | |
|---|---|---|---|
| DE | 1070563 | 12/1959 | |
| DE | 129510 | 7/1969 | |
| FR | 1079799 | * 5/1954 | ................. 366/288 |
| FR | 2728485 | * 6/1996 | |
| GB | 120393 | 3/1919 | |
| GB | 672619 | * 5/1952 | ................. 366/203 |

OTHER PUBLICATIONS

A Welbilt Company; Varimixer Food Mixer Model W 60; 9/96 (2 pages).
American Eagle Food Machinery, Inc.; 100% Gear Transmission Mixer (1 page ); Date unknown.
Univex; The Best Values Just Got Better (3 pages); Date unknown.
Spar Mixer; Heavy Duty Dough Mixers (3 pages); Date unknown.
Dito Dean Food Prep; EM20 Heavy Duty Professional 20 Quart Mixer (1 page); Date unknown.
Service Manual: *Models H–600 and H–600–T and L–800 Mixers,* Hobart Corporation (09/77).
Instructions Manual: *H600 & L800 Mixers,* Hobart Corporation (12/99).

*Primary Examiner*—Charles E. Cooley
(74) *Attorney, Agent, or Firm*—Thompson Hine LLP

(57) ABSTRACT

A mixer comprising a mixer body having a motor for driving a mixing element and a bowl for receiving a material to be mixed. The mixer further includes at least one pin mounted onto one of the mixer body or the bowl and a mounting bracket mounted onto the other of the mixer body or the bowl. The mounting bracket has an opening sized to receive the pin therein to removably and pivotably couple the mixer body and the bowl.

25 Claims, 7 Drawing Sheets

U.S. PATENT DOCUMENTS

| | | | | |
|---|---|---|---|---|
| 4,173,925 A | * | 11/1979 | Leon | 366/220 |
| 4,283,148 A | * | 8/1981 | Peterson | |
| 4,402,466 A | | 9/1983 | Schmidt | |
| 4,765,746 A | | 8/1988 | Suay Puig | |
| 4,937,916 A | | 7/1990 | Redman | |
| 5,409,149 A | | 4/1995 | Hough | |
| 5,472,276 A | * | 12/1995 | Ratermann et al. | 366/203 |
| 5,494,350 A | * | 2/1996 | Childress | 366/220 |
| 5,653,535 A | | 8/1997 | Xie et al. | |
| 5,860,738 A | * | 1/1999 | Brinkman | |
| 2002/0093877 A1 | * | 7/2002 | Brunswick et al. | 366/207 |

* cited by examiner

PIVOTABLE BOWL MOUNTING MECHANISM

BACKGROUND OF THE INVENTION

The present invention is directed to a mechanism for mounting a mixer bowl to a mixer body, and more particularly, to a mechanism for pivotably mounting a mixer bowl to a mixer body.

Mixers are used to mix and blend a wide variety of products, such as food, chemicals, etc. The mixers typically include a mixer body having a motor that drives a generally vertically-extending mixing element. The mixers include a bowl that is located below the mixing element, and receives the mixing element and the materials to be mixed. The bowl is typically detachable from the mixer body to aid in loading and unloading the products into the bowl.

In most existing mixers, the mixer bowl is vertically movable such that the bowl can be lowered away from the mixing element and an overhang portion of the mixer body. The products to be mixed can then be added or removed from the bowl, or the bowl can be detached from the mixer body. However, even after the bowl is lowered, it can be inconvenient for the user to access the mixer bowl due to the location and orientation of the mixer body (more particularly, the overhang portion) relative the mixer bowl.

Accordingly, there is a need for a mechanism for mounting a mixer bowl to the body of the mixer which improves the user's access to the mixer bowl, and is thereby more convenient to use.

SUMMARY OF THE INVENTION

The present invention is a mechanism for coupling a mixer bowl to a mixer body such that the mixer bowl can be pivoted away from the mixer body and quickly and easily coupled and uncoupled from the mixer body. The mechanism enables the bowl to pivot away from the mixer body, which improves access to the bowl and is more convenient to use.

In a preferred embodiment, the invention is a mixer comprising a mixer body having a motor for driving a mixing element, the mixer including a bowl for receiving a material to be mixed. The mixer further includes a pin mounted onto one of the mixer body or the bowl, and a mounting bracket mounted onto the other of the mixer body or the bowl. The mounting bracket has an opening sized to receive the pin therein to removably couple the mixer body and the bowl.

Other objects and advantages of the present invention will be apparent from the following description and the accompanying drawings.

DETAILED DESCRIPTION

Figure 1:
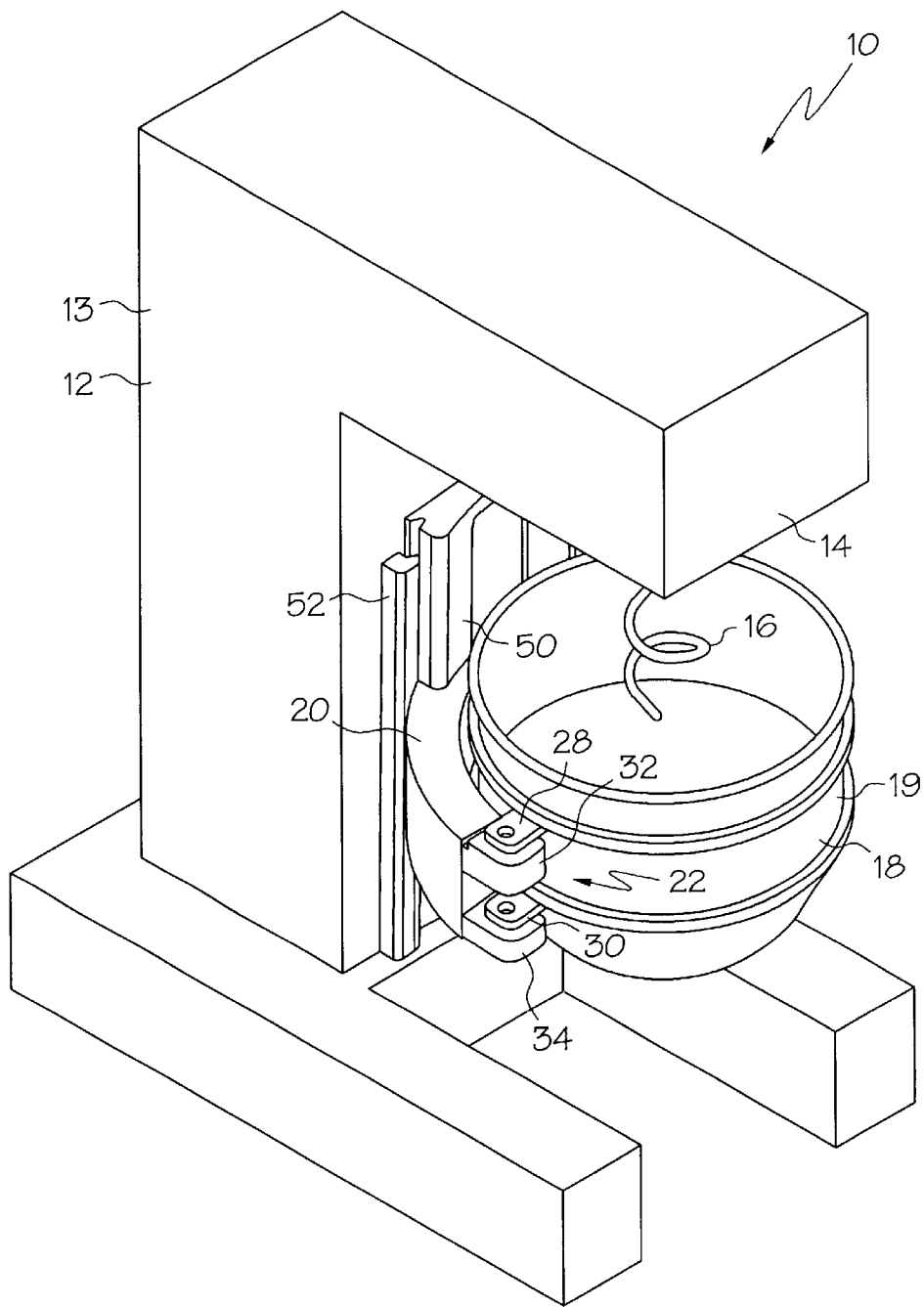
FIG. 1 is a perspective view of a mixer including one embodiment of the mounting mechanism of the present invention.

FIG. 1 illustrates a mixer, generally designated 10, which includes a mixer body 12 having a generally vertically-extending main portion 13, and a overhang portion or transmission head 14. A generally downwardly-extending mixing element 16 (such as a hook) is removably connected to the mixer body 12 by a coupling component (not shown), such as a bayonet-style attachment that is well known in the art. The mixer 10 includes a motor (not shown) that rotates the mixing element 16 about its central axis. A mixer bowl 18 is mounted to a yoke 20 of the mixer body 12, which is shaped to closely receive the mixer bowl 18 therein. The mixer bowl 18 includes a bowl body 19 that contains the products to be mixed (not shown). A mounting mechanism, generally designated 22, pivotably couples the bowl 18 to the yoke 20 and mixer body 12.

Figure 2:
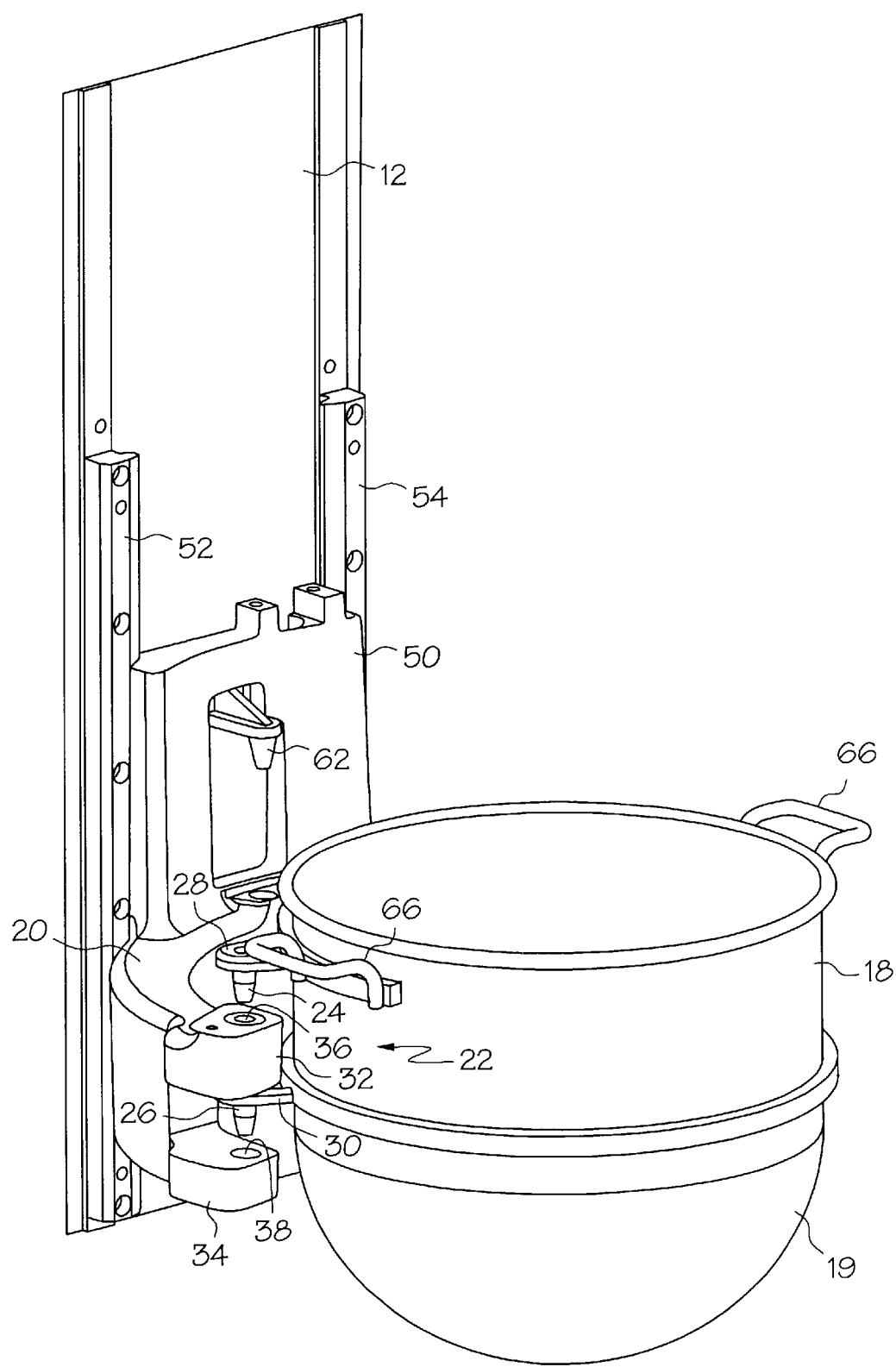
FIG. 2 is a perspective view of part of the mixer of FIG. 1, with the mixer bowl spaced slightly away from the mixer body.
Figure 3:
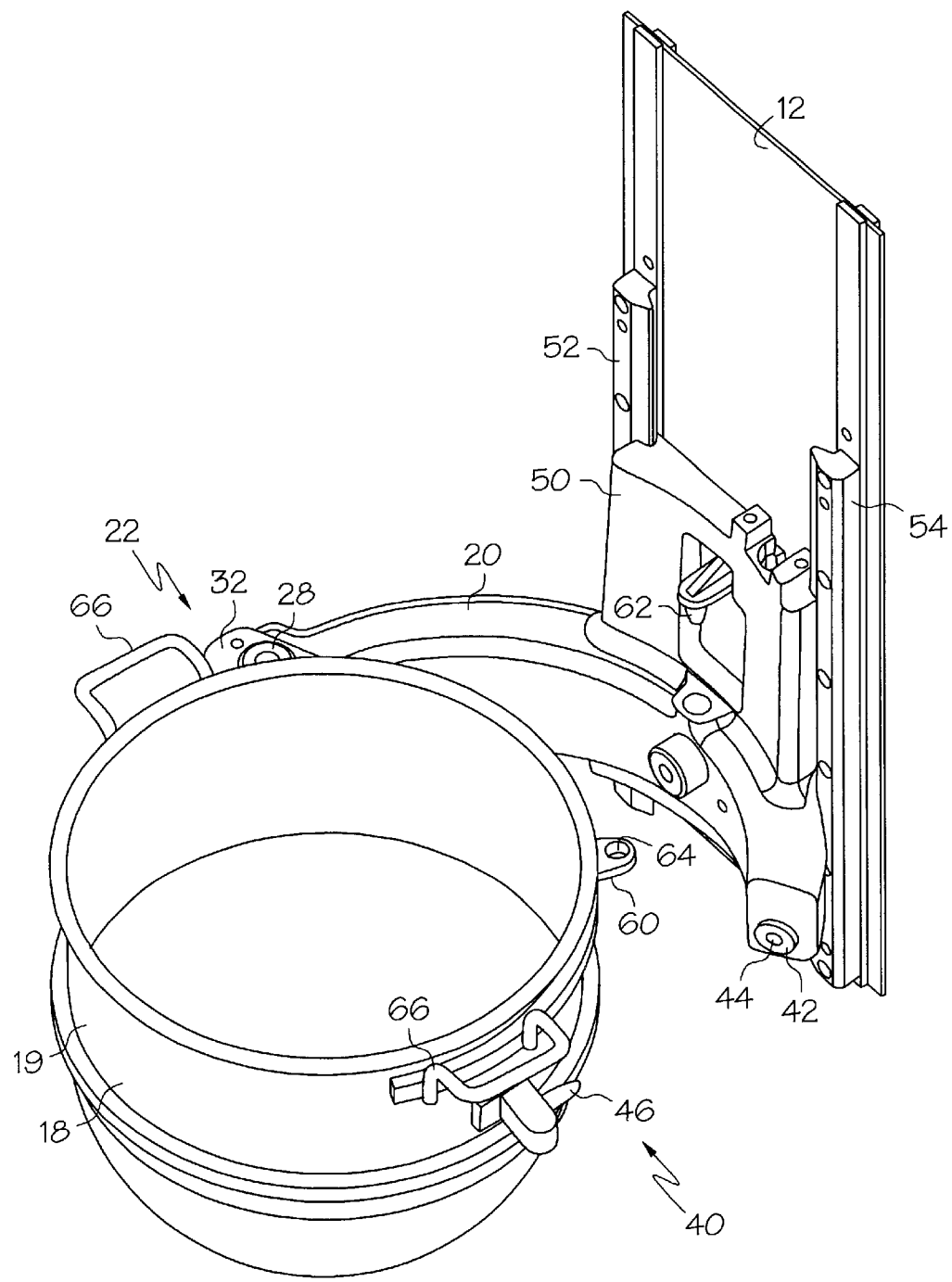
FIG. 3 is a perspective view of the mixer body and mixer bowl of FIG. 2, with the bowl coupled to the mixer body and in the loading position.

As shown in FIG. 2, the mounting mechanism 22 includes a pair of downwardly-extending pins 24, 26, each pin being mounted to the mixer bowl 18 by a pin arm 28, 30 that protrudes generally radially outwardly from the bowl body 19. The mounting mechanism 22 further includes a pair of brackets 32, 34 that are mounted (preferably by casting) onto a distal end of the yoke 20, each bracket 32, 34 having a hole 36, 38 formed therein. As shown in FIG. 2, the pins 24, 26 are generally axially aligned, as are the holes 36, 38. To mount the mixer bowl 18 to the mixer body 12, the bowl 18 is positioned such that the pins 24, 26 are aligned with the holes 36, 38 in each bracket 32, 34, as shown in FIG. 2. The mixer bowl 18 is then lowered such that the pins 24, 26 are received in the corresponding holes 36, 38, and the pin arms 28, 30 engage the top surface of the corresponding mounting bracket 32, 34, as shown in FIG. 3. After each pin 24, 26 is received in a hole 36, 38, each pin/bracket combination forms a hinge about which the mixer bowl 18 can pivot, and the bowl 18 is shown in its loading/unloading position in FIG. 3. The pins 24, 26 preferably have tapered tips to guide the pins 24, 26 into the mounting brackets 32, 34.

Figure 4:
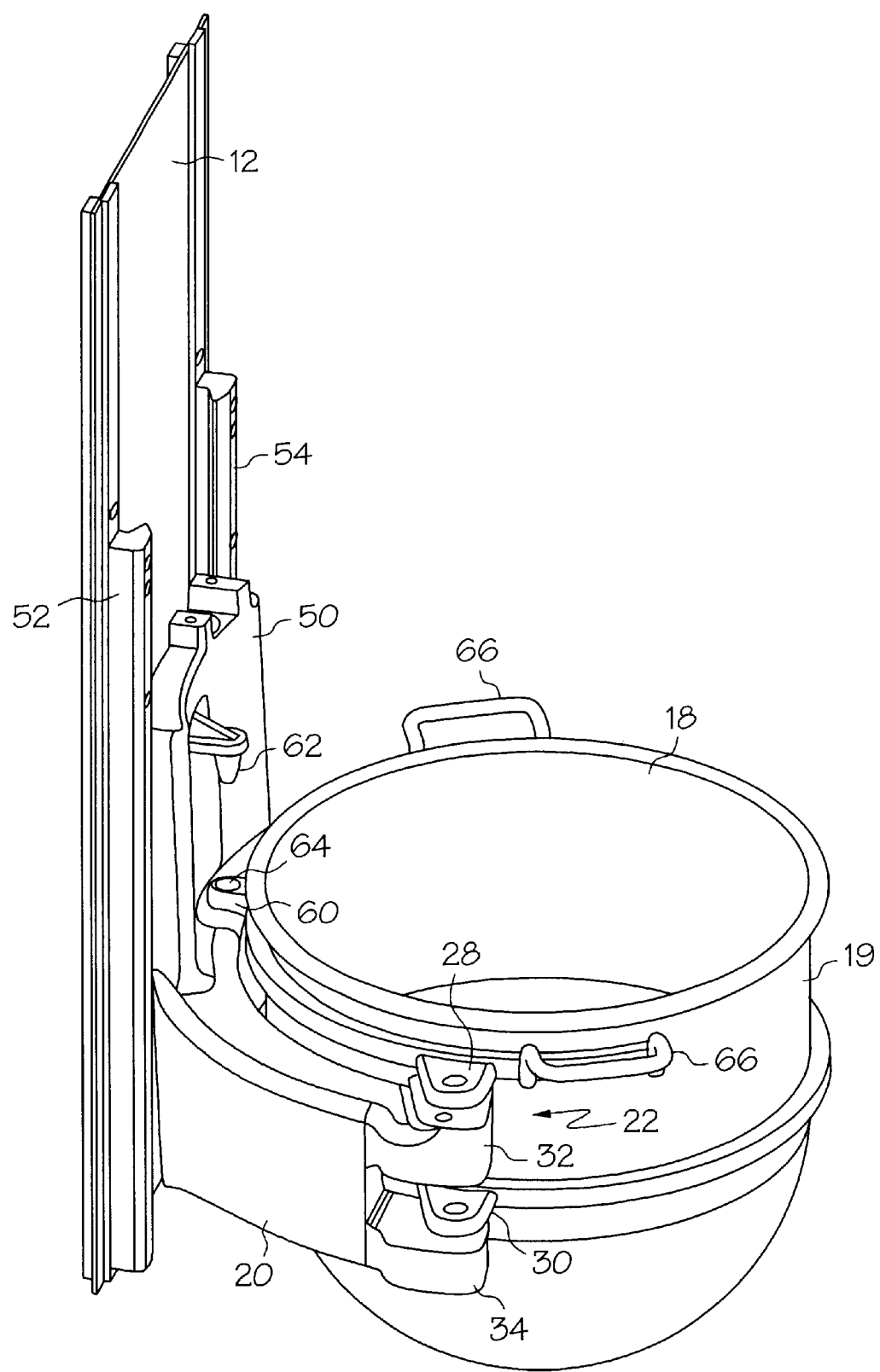
FIG. 4 is a perspective view of the mixer body and mixer bowl of FIG. 3, with the mixer bowl in its closed position.

The mixer bowl 18 can then be pivoted to its closed position, as shown in FIG. 4. In this position, the mixer bowl 18 is received within the yoke 20, and the bowl 18 is aligned such that the mixing element 16 can be received in the mixer bowl 18 when the mixer bowl is raised relative to the mixing element. As shown in FIG. 3, the mixer 10 preferably includes a detent mechanism, generally designated 40, to maintain the bowl 18 in its closed position. The detent mechanism 40 is preferably located on an opposed side of the bowl 18 relative the hinge mechanism 22. In the illustrated embodiment, the detent mechanism 40 includes a relatively soft, deformable washer 42 having an opening formed 44 therein mounted on the yoke 20. The detent mechanism 40 also includes a forwardly extending peg 46 mounted on the bowl 18. The opening 44 in the washer 42 is slightly smaller than the largest portion of the peg 46, such that when the mixer bowl 18 is moved to its closed position, the peg 46 is forced into the washer 42, which retains the peg 46 therein by an interference fit. In this manner, the detent mechanism 40 helps to maintain the mixer bowl 18 in the closed position.

Figure 5:
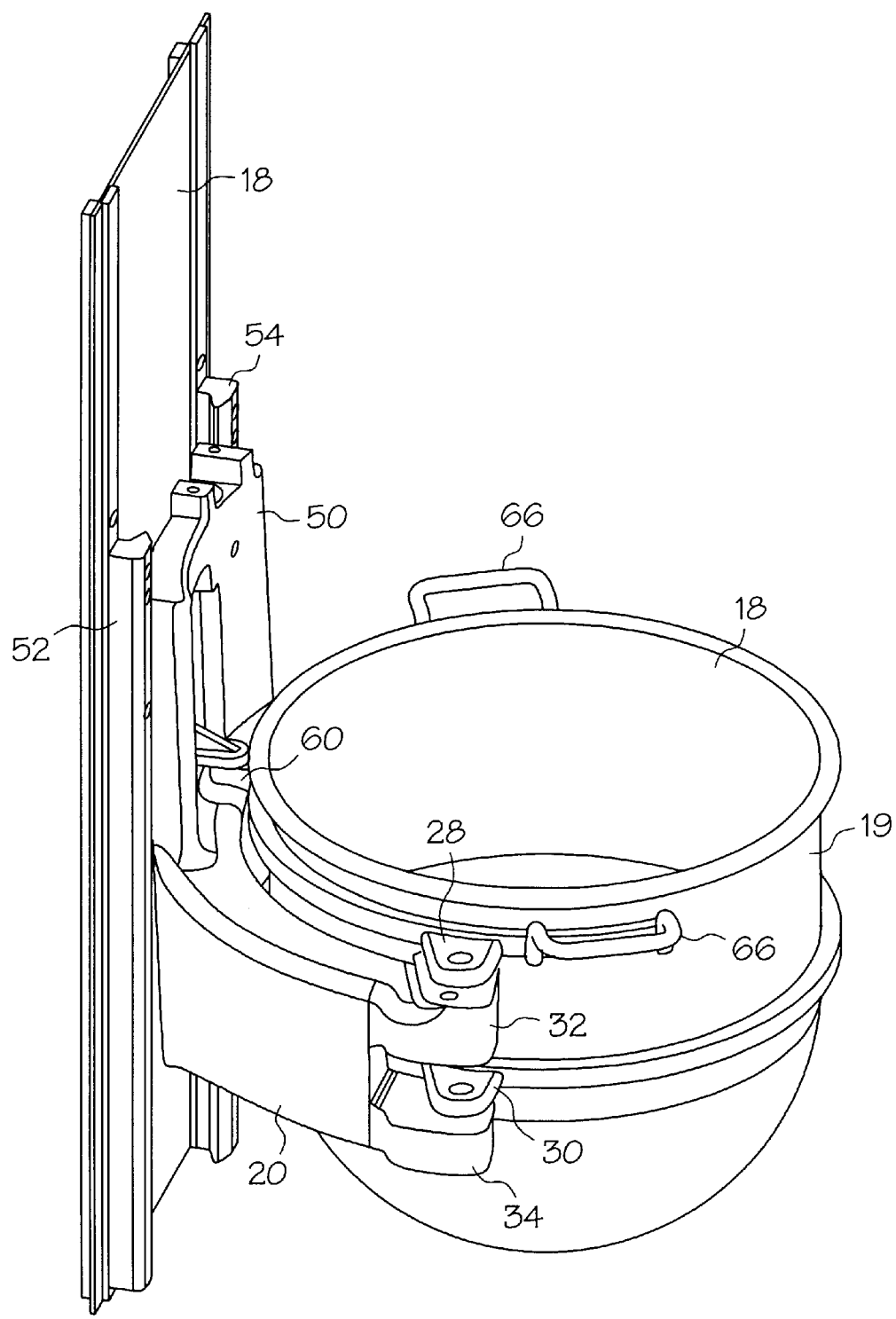
FIG. 5 is a perspective view of the mixer body and mixer bowl of FIG. 4, with the mixer bowl in its use position.

In order to move the bowl from its closed position (FIG. 4) to its use position (FIG. 5), the yoke 20 is raised vertically by moving the yoke base 50 along a pair of vertically-extending tracks 52, 54. Typically, a crank (not shown) or some other similar mechanism is used to raise the yoke 20. As the yoke 20 is raised, it also raises the bowl 18 to its use position, as shown in FIGS. 1 and 5. When the bowl 18 is in the use position, the mixing element 16 can be received in the bowl 18 such that the mixing element 16 can mix the contents of the bowl 18. The mixer bowl 18 includes a locking bracket 60 (FIGS. 3 and 4) having an opening 64, and the mixer body 12 includes a generally downwardly-extending locking pin 62. When the mixer bowl 18 is moved to its use position (FIG. 5), the locking pin 62 is received in the opening 64 in the locking bracket 60 to retain the mixer bowl in the use position; that is, the locking pin/locking bracket combination prevents the mixer bowl 18 from pivoting about the mounting mechanism 22.

The mixer body 12 includes a rotatable coupling member or output component (not shown) for removably receiving the mixing element 16, the output component and mixing element each including an axis of rotation. When the bowl 18 is in its use position, the bowl 18 is located such that the central axis of the bowl 18 is generally aligned with the axis of rotation of the output component such that the mixing element can be rotated and mix the contents of the bowl without hitting the edges of the bowl 18. Each pin 24, 26, 24' 26' and hole or opening 36, 38, 36' 38 includes a central axis that extends generally parallel to the central axis of the bowl when the bowl 18 is mounted to the mixer body 12.

In order to move the bowl from its closed position (FIG. 4) to its use position (FIG. 5), the yoke 20 is raised vertically by moving the yoke base 50 along a pair of vertically-extending tracks 52, 54. Typically, a crank (not shown) or some other similar mechanism is used to raise the yoke 20. As the yoke 20 is raised, it also raises the bowl 18 to its use position, as shown in FIGS. 1 and 5. When the bowl 18 is in the use position, the mixing element 16 can be received in the bowl 18 such that the mixing element 16 can mix the contents of the bowl 18. The mixer bowl 18 includes a locking bracket 60 (FIG. 4) having an opening 64, and the mixer body 12 includes a generally downwardly-extending locking pin 62. When the mixer bowl 18 is moved to its use position (FIG. 5), the locking pin 62 is received in the opening 64 in the locking bracket 60 to retain the mixer bowl in the use position; that is, the locking pin/locking bracket combination prevents the mixer bowl 18 from pivoting about the mounting mechanism 22.

Figure 7:
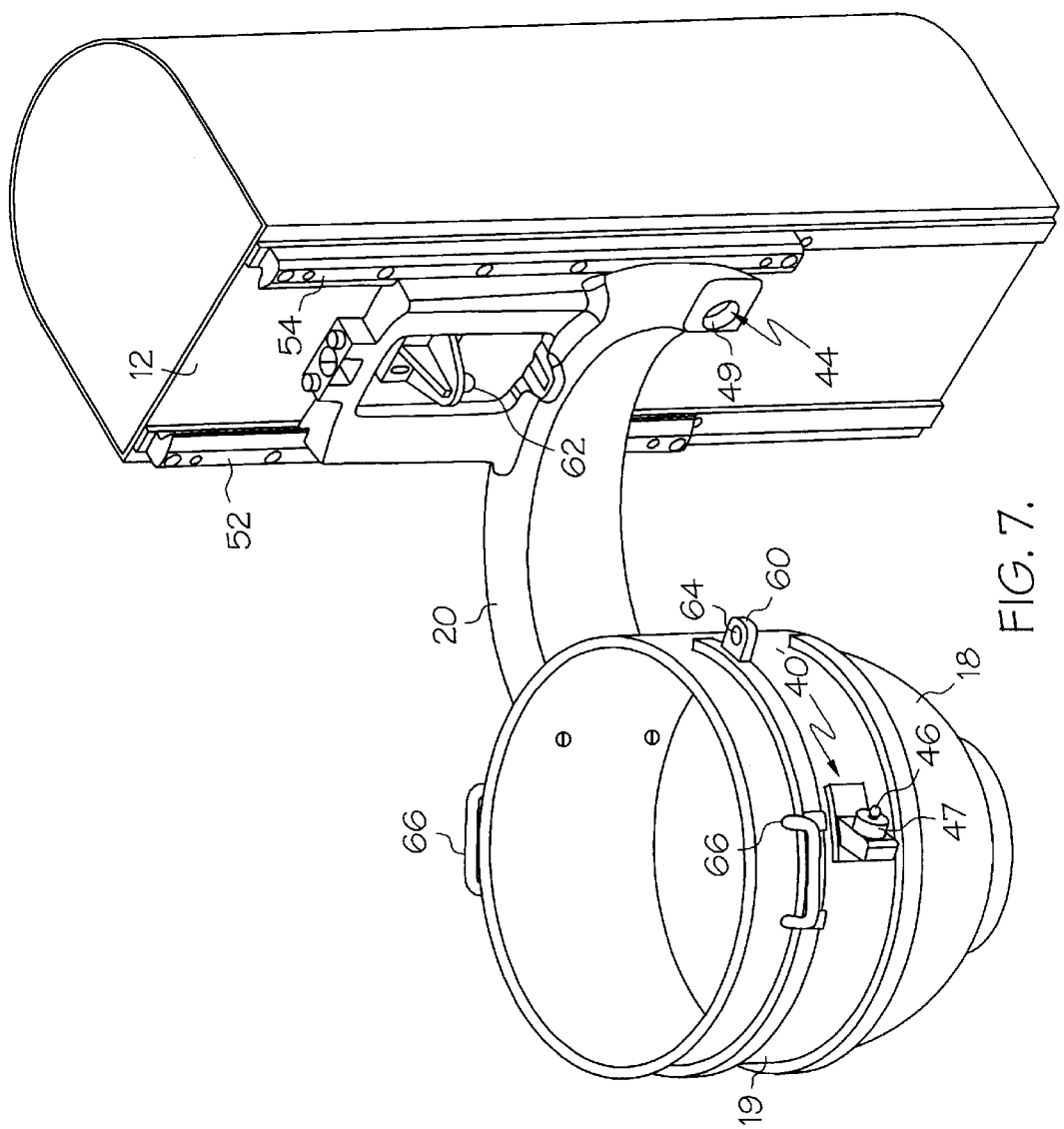
FIG. 7 is a perspective view of a portion of a mixer body and a mixer bowl illustrating an alternate embodiment of the detent mechanism.

The mounting mechanism 22 enables the mixer bowl 18 to be pivoted out from under the overhang portion 14 of the mixer body 12 to its loading/unloading position (FIG. 7). This provides easier access to the bowl 18 for loading and unloading materials in the bowl, and is therefore more convenient to use. When the bowl 18 is pivoted into its loading/unloading position, it is also easer to grip and lift the mixer bowl off of the yoke 20 and to mount the mixer bowl 18 back onto the yoke 20. For example, when in the loading/unloading position both handles 66 of the bowl 18 are pivoted away from the mixer body 12, and can be easily gripped by the user without having to maneuver around the overhang portion 14 of the mixer body 12.

Figure 6:
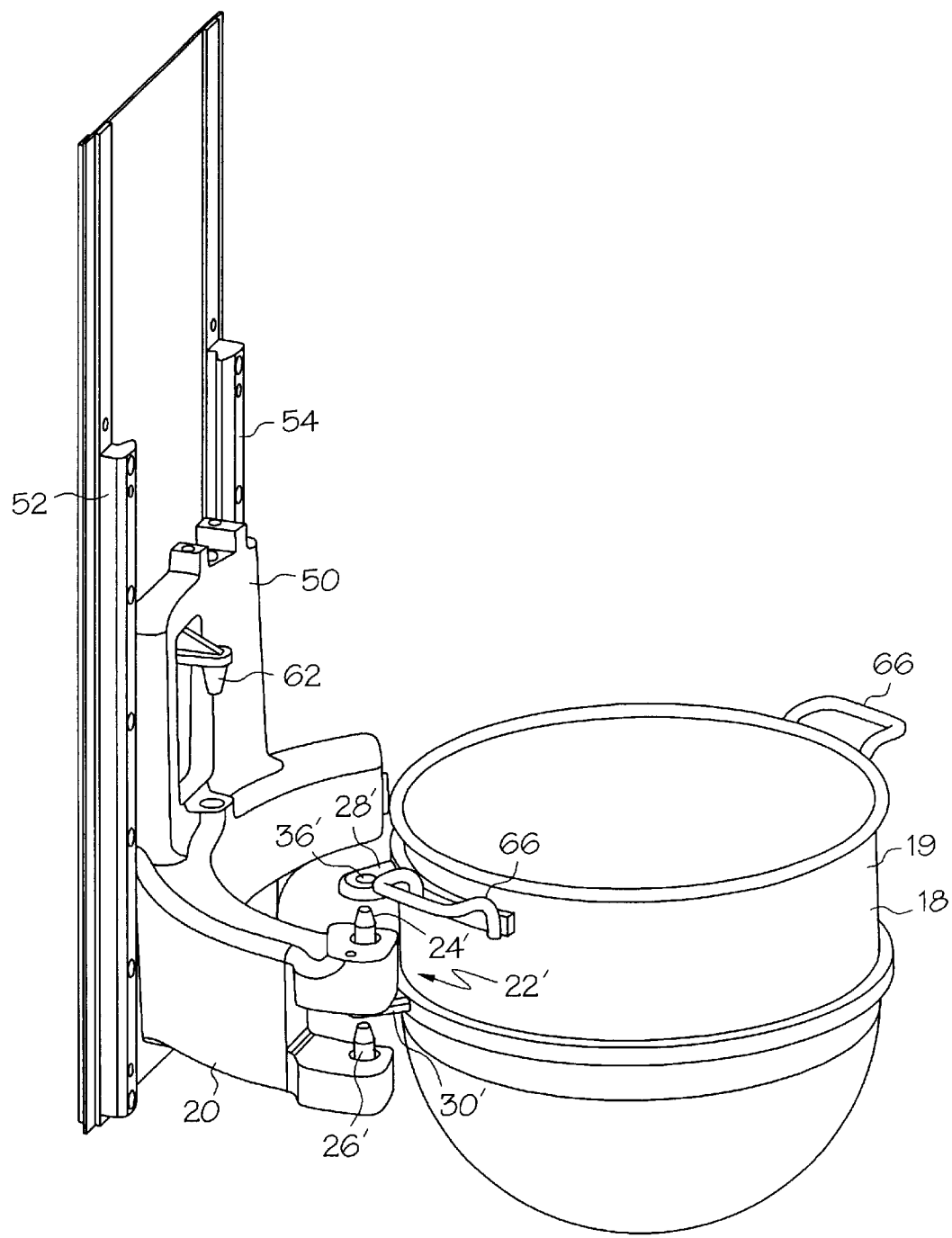
FIG. 6 is a perspective view of a portion of a mixer body and a mixer bowl illustrating an alternate embodiment of the mounting mechanism of the present invention.

Any variety of pins and brackets may be used for mounting the mixer bowl 18 to the mixer body 12. For example, nearly any shape pin 24, 26, preferably having a generally circular, or nearly circular (i.e. hexagonal, elliptical, etc.), cross section, may be used. Furthermore, as shown in FIG. 6, the pins 24', 26' may be located on the yoke 20, and the pin arms 28', 30' may have holes 36', 38' therein such that the pin arms 28', 30' form the mounting brackets. Similarly, the peg 46 of the detent mechanism 40 may be located on the mixer body 12 and the washer 42 may be located on the bowl 18. The locking bracket 60 may be located on the bowl 18 and the locking pin 62 may be located on the mixer body 12. The holes 36', 38' may be located on nearly any surface of the yoke 22 or of the mixer body 12. For example, the holes 36', 38' in the embodiment shown in FIG. 6 may be located on a lip (not shown) or other various mounting surfaces of the mixer body 12.

Having described the invention in detail and by reference to the preferred embodiments, it will be apparent that modifications and variations thereof are possible without departing from the scope of the invention.

What is claimed is:

1. A mixer comprising:
   a mixer body having a motor for driving a mixing element;
   a bowl for receiving a material to be mixed;
   a pin;
   an auxiliary pin, said pin and said auxiliary pin both being mounted onto one of said mixer body or said bowl, the axes of said pin and said auxiliary pin being generally aligned;
   a mounting bracket having an opening sized to receive said pin therein to removably couple said mixer body and said bowl; and
   an auxiliary mounting bracket, said auxiliary mounting bracket having an opening sized to receive said auxiliary pin therein to removably couple said mixer body and said bowl, said mounting bracket and said auxiliary mounting bracket both being mounted on the other of said mixer body or said bowl, the openings of said mounting bracket and said auxiliary mounting bracket being generally aligned, wherein said pin and said auxiliary pin define a pivot axis about which said bowl can pivot relative to said mixer body when said pin is received in said opening of said bracket and said auxiliary pin is received in said opening of said auxiliary bracket.

2. The mixer of claim 1 wherein each pin has a generally circular cross section.

3. The mixer of claim 1 wherein said bowl can pivot between a closed position, wherein said bowl is located adjacent said mixer body, and a loading position wherein said bowl is not located adjacent said mixer body.

4. The mixer of claim 3 further comprising a detent mechanism coupled to at least one of said mixer body or said bowl that can maintain said bowl in said closed position.

5. The mixer of claim 4 wherein said detent mechanism includes a peg located on one of said mixer body or said bowl and a washer having a opening for receiving and retaining said peg therein located on the other of said mixer body or said bowl.

6. The mixer of claim 1 wherein said mixer body includes a yoke, and wherein said pins or said mounting brackets mounted on said mixer body are located on said yoke.

7. The mixer of claim 6 wherein said pin or said mounting bracket is mounted on a distal end of said yoke.

8. The mixer of claim 6 wherein said yoke is shaped to engage an outer surface of said bowl when said bowl is in said closed position.

9. The mixer of claim 1 wherein each pin extends generally downwardly and is located on said bowl, and wherein each mounting bracket is located on said mixer body.

10. The mixer of claim 1 further comprising a locking pin located on one of said mixer body or said bowl and a locking bracket located on the other of said mixer body or said bowl, wherein said locking pin is received in said locking bracket to couple said bowl and said mixer body when said bowl is raised relative said mixer body.

11. The mixer of claim 1 wherein each pin extends generally upwardly and is located on said mixer body, and wherein each mounting bracket is located on said bowl.

12. The mixer of claim 1 further comprising a first detent mechanism located on said bowl for cooperating with a second detent mechanism on said mixer body for preventing said bowl from pivoting relative said mixer body, and a locking bracket having an opening and being located on said mixer body and between said first detent mechanism and said at least one of said mounting brackets.

13. The mixer of claim 1 wherein said pin and said auxiliary pin both extend in generally the same direction.

14. The mixer of claim 1 wherein said pin and said auxiliary pin both extend generally upwardly.

15. The mixer of claim 1 wherein the vertical distance between said pin and said auxiliary pin is fixed.

16. A mixer bowl for being mounted to a mixer body comprising:

a bowl body for receiving material to be mixed;

a first mounting bracket coupled to said bowl body and having an opening;

a second mounting bracket coupled to said bowl body and being vertically spaced from said first mounting bracket, said second mounting bracket having an opening generally aligned with said opening of said first mounting bracket, said openings of said first and second mounting brackets each being shaped to receive a pin of said mixer body therein to pivotally mount said mixer bowl to said mixer body, said openings defining a pivot axis about which said bowl can pivot.

17. The mixer bowl of claim 16 further comprising a first detent mechanism coupled to said bowl body for cooperating with a second detent mechanism mounted on said mixer body for preventing said mixer bowl from pivoting relative said mixer body.

18. The mixer bowl of claim 17 wherein said first detent mechanism is located on an opposed side of said bowl body relative to said first and second mounting brackets.

19. The mixer bowl of claim 17 wherein said bowl body is pivotable between a closed position wherein said bowl body is located adjacent said mixer body and a loading position wherein said bowl body is generally not located adjacent said mixer body, and wherein said first detent mechanism is located on a portion of said bowl body that is located adjacent said mixer body when said bowl body is in said closed position.

20. The mixer bowl of claim 17 wherein said first detent mechanism includes a generally forwardly-extending peg.

21. The mixer bowl of claim 16 further comprising a locking bracket coupled to said bowl body and having an opening, wherein said locking bracket is located to receive a locking pin of said mixer body therein when said mixer bowl is raised relative said mixer body.

22. The mixer bowl of claim 16 wherein each mounting bracket extends generally radially outwardly from said bowl body, and each opening has a central axis that extends generally vertically.

23. The mixer bowl of claim 16 wherein each mounting bracket is coupled to an outer surface of said bowl.

24. A pivotable mixer bowl comprising:

a bowl body for receiving material to be mixed;

a first mounting bracket coupled to and extending from an outer surface of said bowl body and having an opening therein;

a second mounting bracket coupled to and extending from an outer surface of said bowl body and having an opening therein, said second mounting bracket being vertically spaced from said first mounting bracket, said opening of said second mounting bracket being generally aligned with said opening of said first mounting bracket to define a pivot axis of said mixer bowl.

25. The mixer bowl of claims 24 further comprising a first detent mechanism coupled to said bowl body for cooperating with a second detent mechanism mounted on a mixer body for preventing said mixer bowl from pivoting relative said mixer body.

* * * * *

UNITED STATES PATENT AND TRADEMARK OFFICE
CERTIFICATE OF CORRECTION

PATENT NO.    : 6,494,610 B1
DATED         : December 17, 2002
INVENTOR(S)   : Brian A. Brunswick It is certified that error appears in the above-identified patent and that said Letters Patent is hereby corrected as shown below:

Column 6,
Line 36, change "claims" to -- claim --.

Signed and Sealed this

Thirteenth Day of May, 2003

JAMES E. ROGAN
*Director of the United States Patent and Trademark Office*